Patented Jan. 7, 1947

2,414,024

UNITED STATES PATENT OFFICE 2,414,024

STABILIZED MAGMA AND METHOD OF MAKING SAME

Frank B. Cooper, Evanston, Ill., assignor to Wyeth Incorporated, Philadelphia, Pa., a corporation of Delaware No Drawing. Application April 5, 1944, Serial No. 529,872

18 Claims. (Cl. 252—312)

The present invention pertains to magnesium hydroxide suspensions or dispersions and to a method of manufacturing the same. It particularly pertains to the preparation of magnesium hydroxide or hydrated magnesium oxide dispersions of increased viscosity and stability. The invention is especially concerned with the preparation of a relatively stable magnesium hydroxide dispersion of increased viscosity which may be compounded with mineral oil or similar oils to form dispersions or emulsions by conventional methods with or without the assistance of an emulsifying agent such as agar or its derivatives, acacia, karaya, psyllium; cellulose derivatives of a type such as methyl cellulose, or combinations of like emulsifying agents.

One object of my invention is to provide a magnesium hydroxide magma of improved stability. A further object is to provide a magnesium hydroxide magma having a greater viscosity than a magnesium hydroxide magma having the same content of magnesium hydroxide and prepared in the same manner but without using the modifying agents of the invention. A specific object of the invention is to provide an emulsion of an oil such as mineral oil in water, of increased stability from the standpoint of there being less tendency for the water to separate from the oil.

I have found that the addition of a small amount of an alkaline earth salt of a cyclic or substituted cyclic acid to a magnesium hydroxide suspension or dispersion increases the viscosity and stability of the magnesium hydroxide magma. I have further found that the magnesium hydroxide magma so prepared may be used successfully to increase the stability of oil and water emulsions such as mineral oil-in-water emulsions. To this end, I prefer to form the alkaline earth salt of the cyclic or substituted cyclic acid in situ in the magnesium hydroxide magma and I prefer also to have present a small amount of emulsifying agent such as that mentioned hereinabove.

The viscosity measurements set forth in the following examples were made with a MacMichael viscosimeter equipped with a #26 wire in Example 7, and equipped with a #22 wire in the other examples. It will be understood, of course, that the examples are given for the purpose of illustration and are not to be considered limitative.

Example I 275 gms. of a paste containing 30% magnesium hydroxide was converted into a magnesium hydroxide magma by dilution with 275 gms. of distilled water and thorough agitation with a mechanical mixer. To the resulting dispersion 1.0 gms. of calcium benzoate previously dissolved in 449 gms. of water was slowly added with good agitation. The viscosity of the dispersion thus made was 57 compared to a viscosity of 28 in the case of a dispersion made without calcium benzoate in the usual manner and having the same content of magnesium hydroxide.

Example II 275 gms. of distilled water were slowly stirred into 275 gms. of a paste containing 30% magnesium hydroxide and 0.25 gm. of magnesium salicylate previously dissolved in 449.75 gms. of distilled water was then added with thorough stirring. The viscosity of the resulting magnesium hydroxide dispersion was 45 compared to a viscosity of 28 for the same type of dispersion to which no magnesium salicylate had been added.

Example III

To 275 gms. of a paste containing 30% of magnesium hydroxide, 1.0 gm. of nicotinic acid, previously suspended in 100 gm. of distilled water, was added and the mixture stirred thoroughly by hand. Stirring was continued vigorously while sufficient distilled water was added to make the total weight of the dispersion 1,000 gms. The viscosity of the resulting dispersion was 1.9 times that of the dispersion containing no nicotinic acid but prepared in the same manner. It is believed in this case, that magnesium nicotinate is formed in situ and is responsible for the improvement attained.

Example IV 275 gms. of a paste containing 30% of magnesium hydroxide was dispersed with the aid of a mechanical mixer in 275 gms. of distilled water. A solution of 0.25 gm. of magnesium salicylate and 0.25 gm. of calcium benzoate in 449.5 gms. of distilled water was slowly added to the dispersion of magnesium hydroxide while continuing the agitation with the mechanical mixer. The viscosity of this dispersion was 58 while the viscosity of a dispersion made in the usual manner but having the same content as to magnesium hydroxide was 28.

Example V 275 gms. of a paste containing 30% of magnesium hydroxide was dispersed with the aid of a mechanical mixer in an equal weight of distilled water. A solution of 1.0 gm. of benzoic acid in 449 gms. of water was slowly added to the dispersion with adequate mixing. The dispersion after passing through a colloid mill with 0.003 inch clearance has a viscosity of 70 as compared to a viscosity of 33 for a similarly prepared dispersion without the addition of benzoic acid. In this case, it is believed that magnesium benzoate is formed in situ.

*Example VI*

275 gms. of a paste containing 30% of magnesium hydroxide was dispersed in an equal weight of water after which 0.25 gm. of magnesium benzoate previously dissolved with 549.75 gms. of water was added with adequate stirring to produce a uniform dispersion. This dispersion had a viscosity of 52 and when centrifuged in 150 mm. tubes at 1500 R. P. M. for 15 minutes showed a supernatant layer which was 41 mm. in height while a dispersion made in the same manner but without magnesium benzoate had a viscosity of 28 and showed a supernatant layer of water which was 55 mm. in height. When 25 cc. of the dispersion made with the magnesium benzoate was diluted with distilled water in a 50 cc. stoppered graduate to a volume of 50 cc. and allowed to stand undisturbed for 24 days at room temperature, the amount of settling indicated by the clear supernatant layer of water was equal to 7 cc. whereas the clear supernatant layer of the control dispersion containing no magnesium benzoate was equal to 13 cc.

*Example VII*

57 gms. of U. S. P. magnesium oxide was triturated with 1.0 gm. of p-aminobenzoic acid in a mortar and the mixture was sifted into 600 gms. of distilled water at 70° F. The mixture was gently stirred during the addition and then was allowed to stand overnight at 70° F. On the following morning, sufficient distilled water was added to make 1,000 gms. of magma which was run through a colloid mill with 0.003 inch clearance. The viscosity of the dispersion so prepared was 20 while the viscosity of a dispersion containing the same ingredients with the exception of p-aminobenzoic acid and made in the same manner was only 9.

*Example VIII*

309.4 gms. of a paste containing 30% of magnesium hydroxide was dispersed by stirring into 300 gms. of water and a solution of 0.75 gm. of magnesium benzoate in 514 gms. of water was slowly added while the dispersion was stirred rapidly using a mechanical mixer. 375 gms. of mineral oil were added to this dispersion with stirring, after which the emulsion or dispersion was run through a colloid mill with a 0.003 inch clearance. The viscosity of the resulting mineral oil dispersion was 82 as compared to 60 for a mineral oil dispersion made by the same procedure but without the presence of magnesium benzoate. The enhanced stability thus obtained was demonstrated by the fact that centrifugation at 1500 R. P. M. for 30 minutes caused no separation while the mineral oil dispersion used as the control test similarly showed a separation of 44 mm.

*Example IX*

200 gms. of a paste containing 30% of magnesium hydroxide was dispersed with mechanical agitation in 200 gms. of water and the resulting dispersion was mixed by means of rapid stirring with a second dispersion weighing 350 gms. and containing 1.0 gm. of an agar derivative, 0.75 gm. of magnesium benzoate and 20 gms. of glycerol. The stirring was continued while 250 gms. of mineral oil were added after which the mixture was run twice through a colloid mill with a 0.003 inch clearance. The viscosity of the mineral oil dispersion was 72 as compared to 48 for a similarly made dispersion containing no magnesium benzoate. The increased stability thus attained was shown by the fact that centrifugation at 1500 R. P. M. for 30 minutes caused no separation while a control having the viscosity of 48 showed a separation of 50 mm.

The invention is particularly applicable to the preparation of more stable magnesium hydroxide magmas, particularly those having a magnesium hydroxide content of 7 to 8.5%.

As will be understood by those skilled in the art, various modifications of the present invention, as hereinbefore set forth, may be made without departing from the spirit of the invention as defined in the appended claims.

I claim:

1. A composition of matter comprising at least about 6 percent magnesium hydroxide in the form of a dispersion and containing an alkaline earth salt of a cyclic acid taken from the group consisting of N-heterocyclic and aromatic carboxylic acids, in a small amount sufficient to increase the viscosity of said dispersion.

2. A composition of matter comprising at least about 6 percent magnesium hydroxide in the form of a dispersion and containing an alkaline earth salt of an N-heterocyclic acid in a small amount sufficient to increase the viscosity of said dispersion.

3. A composition of matter comprising at least about 6 percent magnesium hydroxide in the form of a dispersion and containing an alkaline earth salt of an aromatic acid in a small amount sufficient to increase the viscosity of said dispersion.

4. A composition of matter consisting of an emulsion comprising at least about 6 percent magnesium hydroxide, an oil and an alkaline earth salt of a cyclic acid taken from the group consisting of N-heterocyclic and aromatic carboxylic acids, in a small amount sufficient to increase the viscosity of said emulsion.

5. A composition of matter consisting of an emulsion comprising at least about 6 percent magnesium hydroxide, a mineral oil, and an alkaline earth salt of a cyclic acid taken from the group consisting of N-heterocyclic and aromatic carboxylic acids, in a small amount sufficient to increase the viscosity of said emulsion.

6. A composition of matter consisting of an emulsion comprising at least about 6 percent magnesium hydroxide, mineral oil, and an alkaline earth salt of an N-heterocyclic acid in a small amount sufficient to increase the viscosity of said emulsion.

7. A composition of matter consisting of an emulsion comprising at least about 6 percent magnesium hydroxide, mineral oil, and an alkaline earth salt of an aromatic acid in a small amount sufficient to increase the viscosity of said emulsion.

8. A composition of matter consisting of an emulsion comprising at least about 6 percent magnesium hydroxide, a mineral oil, and a calcium salt of a cyclic acid, taken from the group consisting of N-heterocyclic and aromatic carboxylic acids, in a small amount sufficient to increase the viscosity of said emulsion.

9. A composition of matter consisting of an emulsion comprising at least about 6 percent magnesium hydroxide, a mineral oil, and a magnesium salt of a cyclic acid, taken from the group consisting of N-heterocyclic and aromatic carboxylic acids, in a small amount sufficient to increase the viscosity of said emulsion.

10. A composition of matter consisting of an emulsion comprising at least about 6 percent magnesium hydroxide, a mineral oil, and calcium benzoate in a small amount sufficient to increase the viscosity of said emulsion.

11. A composition of matter consisting of an emulsion comprising at least about 6 percent magnesium hydroxide, a mineral oil, and magnesium nicotinate in a small amount sufficient to increase the viscosity of said emulsion.

12. A composition of matter consisting of an emulsion comprising at least about 6 percent magnesium hydroxide, a mineral oil, and magnesium benzoate in a small amount sufficient to increase the viscosity of said emulsion.

13. A process for preparing a magnesium hydroxide dispersion containing at least about 6 percent magnesium hydroxide and having increased viscosity and stability comprising mixing magnesium hydroxide paste with water in the presence of an alkaline earth salt of a cyclic acid, taken from the group consisting of N-heterocyclic and aromatic carboxylic acids, in a small amount sufficient to increase the viscosity of said dispersion.

14. The process of claim 11, in which the alkaline earth salt is a magnesium salt.

15. The process of claim 11, in which the alkaline earth salt is magnesium benzoate.

16. A composition as defined in claim 1, in which the alkaline earth salt is a magnesium salt.

17. A composition as defined in claim 1, in which the alkaline earth salt is magnesium benzoate.

18. A composition as defined in claim 9, in which the magnesium salt is magnesium benzoate.

FRANK B. COOPER.

Certificate of Correction

Patent No. 2,414,024. January 7, 1947.

FRANK B. COOPER

It is hereby certified that errors appear in the printed specification of the above numbered patent requiring correction as follows: Column 6, lines 9 and 11, claims 14 and 15, respectively, for the claim reference numeral "11" read *13;* and that the said Letters Patent should be read with these corrections therein that the same may conform to the record of the case in the Patent Office.

Signed and sealed this 25th day of March, A. D. 1947.

[SEAL]

LESLIE FRAZER,
*First Assistant Commissioner of Patents.*